United States Patent [19]

Urbani

[11] Patent Number: 4,619,015

[45] Date of Patent: * Oct. 28, 1986

[54] VACUUM LOADING CLEANING SYSTEM

[75] Inventor: William G. Urbani, Stockton, Calif.

[73] Assignee: Industrial Innovations, Inc., Stockton, Calif.

[ * ] Notice: The portion of the term of this patent subsequent to Aug. 21, 2001 has been disclaimed.

[21] Appl. No.: 657,284

[22] Filed: Oct. 2, 1984

[51] Int. Cl.$^4$ .......................... A47L 5/12; B08B 3/02; B08B 3/10; B07C 5/00

[52] U.S. Cl. ...................................... 15/302; 134/104; 210/534; 210/537

[58] Field of Search .................. 15/302; 134/10, 94, 134/96, 103, 104, 109, 110, 111, 169 R, 172, 184, 198; 210/242.3, 521, 534, 537

[56] References Cited

U.S. PATENT DOCUMENTS

| | | | |
|---|---|---|---|
| 640,528 | 1/1900 | Bennett | 210/521 X |
| 1,176,774 | 3/1916 | Morris | 210/521 X |
| 2,139,096 | 12/1938 | Piquerez | 134/111 X |
| 2,814,531 | 11/1957 | Murray | 406/106 |
| 2,834,359 | 5/1958 | Kearney | 134/111 X |
| 2,860,785 | 11/1958 | Gardner | 134/111 X |
| 3,046,163 | 7/1962 | Kearney et al. | 134/111 X |
| 3,140,828 | 7/1964 | Galanor | 134/109 X |
| 3,372,704 | 3/1968 | Ashworth | 134/109 |
| 3,477,178 | 11/1969 | Hulbert, Jr. | 134/167 R |
| 3,502,215 | 3/1970 | Cahan | 134/109 X |
| 3,565,252 | 2/1971 | Sheehy | 210/104 |
| 3,719,191 | 3/1973 | Zimmerly | 134/102 |
| 3,774,625 | 11/1973 | Wiltrout | 134/104 |
| 3,979,290 | 9/1976 | Loffler | 210/83 |
| 4,011,158 | 3/1977 | Cook | 210/242.3 X |
| 4,134,174 | 1/1979 | Flynn et al. | 15/302 |
| 4,398,551 | 8/1983 | Moorehead | 134/104 |
| 4,466,154 | 8/1984 | Urbani | 15/302 |

FOREIGN PATENT DOCUMENTS

| | | | |
|---|---|---|---|
| 565023 | 10/1958 | Canada | 210/196 |
| 1300903 | 8/1969 | Fed. Rep. of Germany | 210/332 |
| 56-52325 | 11/1981 | Japan | 406/106 |

OTHER PUBLICATIONS

Oliver, J. T., Western Electric Technical Digest No. 37, pp. 19-20, Jan. 1975.

Primary Examiner—Harvey C. Hornsby
Assistant Examiner—Scott J. Haugland
Attorney, Agent, or Firm—Townsend and Townsend

[57] ABSTRACT

The vacuum loading cleaning system includes a pair of interconnected pressure vessels containing a cleaning liquid pumped out of one or both of the pressure vessels, through a heat exchanger and into a dirty tank. Cleaning liquid and dislodged contaminants are sucked up from the dirty tank by a partial vacuum above the cleaning liquid within the pressure vessel. A submersible booster pump aids passage of material along the vacuum line. Solids and cleaning liquid from the pressure vessel are separated by a solids separator with the cleaning liquid being returned to the pressure vessels. A skimmer is used within one or both of the pressure vessels to remove floating solids and liquid contaminants from the system. A phase separator, mounted beneath the suction inlets so that the material from the dirty tank passes through the phase separator, speeds the separation and concentration of solids, liquids and gases/vapors. The phase separator includes a number of vertically aligned, downwardly and inwardly tapered truncated conical concentrators with open tops and open bottoms above and below the free surface.

11 Claims, 1 Drawing Figure

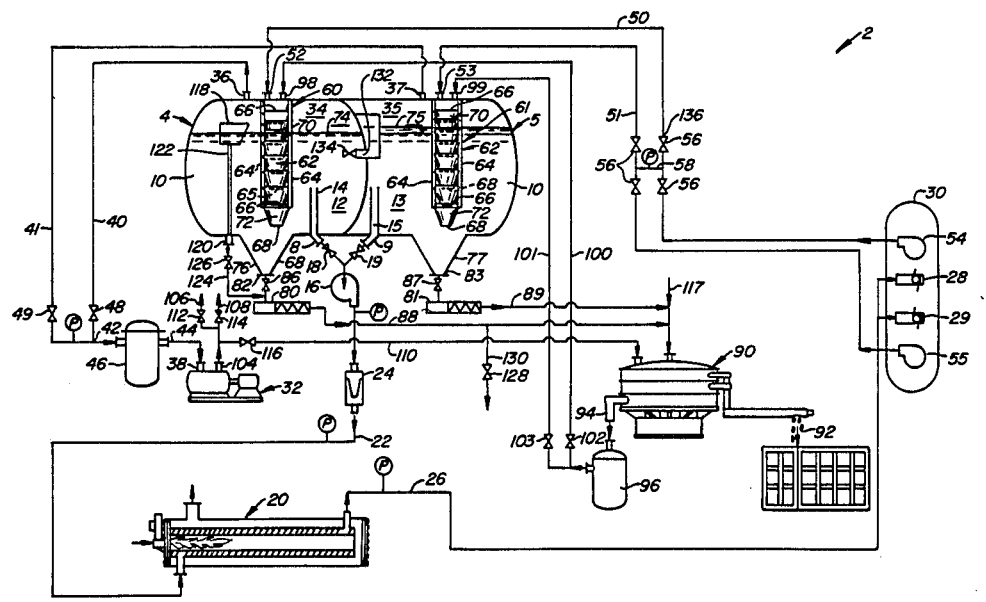

VACUUM LOADING CLEANING SYSTEM

BACKGROUND OF THE INVENTION

The present invention is related to pressurized cleaning systems, particularly one which uses a vacuum line for the pickup of the cleaning liquid and dislodged contaminants from a dirty tank or other dirty surface, removes the dislodged contaminants from the cleaning liquid and recycles the cleaning liquid for spraying against the dirty surface.

Industrial tanks are often cleaned after the tank is empty. To do so the interior of the tank is usually sprayed with high pressure cleaning liquids to dislodge the contaminants, both liquid and solid, from the tank surfaces. Because the impact of the high pressure spray is diffused if there is a liquid layer within the tank, it is desirable to keep the amount of cleaning liquid (as well as dislodged contaminants) which collects at the bottom of the tank to a minimum.

Oil tankers pose special problems for tank cleaning apparatus. Oil as pumped out of the ground commonly contains rocks, sand and gravel. In addition to this naturally present foreign matter, a great number of rags find their way into the oil holding compartments of oil tankers. The presence of contaminants of types which both float and sink create additional problems during cleaning operations.

A tank cleaning system has been used wherein a cleaning liquid is sprayed into the tank and simultaneously sucked out of the tank. This cleaning system is illustrated in U.S. Pat. No. 4,466,154 at FIGS. 1 and 2. The cleaning liquid is stored in a pressure vessel and incompletely fills the vessel so that a space is left above the free surface of the liquid. A pressure pump draws the liquid from the lower regions of the vessel and forces the liquid through a pressure line to a fuel fired heat exchanger. As the cleaning liquid passes through the heat exchanger it is heated and then passes through a line where the high pressure, high temperature liquid is used to clean inside of the tank.

Simultaneously with the spraying of high pressure, high temperature cleaning liquid in the tank, a vacuum line draws the sprayed cleaning liquid and dislodged contaminants from the bottom of the tank. The vacuum line terminates at the pressure vessel where the cleaning liquid and contaminants are discharged into the cleaning liquid therein. A vacuum is created within the space above the free surface of the liquid within the pressure vessel by a vacuum pump. Cleaning liquid and contaminants withdrawn from the tank never pass through the vacuum pump.

Although the available systems will allow tanks to be cleaned using recycled cleaning liquid, they lack an efficient method for handling solid and floating contaminants.

SUMMARY OF THE INVENTION

The vacuum loading cleaning system of the invention includes a pressure vessel containing a cleaning liquid. The cleaning liquid is pumped out of the pressure vessel, through a heat exchanger and into the dirty tank to be cleaned. A vacuum pump draws a partial vacuum above the free surface of the cleaning liquid within the pressure vessel. A vacuum line is connected at its inner end to the partial vacuum space above the free surface of the cleaning liquid; its outer end is positioned on the bottom of the dirty tank to suck up the cleaning liquid and dislodged contaminants from the dirty tank. A submersible trash pump placed at the outer end of the vacuum line aids passage of the cleaning liquid and dislodged contaminants passing along the vacuum line.

A solids remover pump pumps a mixture of solids and liquids from the bottom of the pressure vessel into a solids separator. The solids separator separates the solids from the cleaning liquid, the liquid collecting in a liquid pot. The cleaning liquid is sucked back into the pressure vessel through a line connecting the liquid pot with the partial vacuum space in the pressure vessel.

In the preferred embodiment a pair of pressure vessels are used. The pressure vessels are connected so they can be used in series or in parallel. Typically, the dirty water and dislodged solids are directed through a suction inlet in the second pressure vessel. Most, if not all, of the large solids settle in the second vessel. The pressure vessels are connected to one another in the region adjacent the cleaning liquid free surfaces in each. In this way liquid from the second vessel is taken at its free surface and passes into the first vessel. This ensures that any liquid contaminants which are lighter than the cleaning liquid become concentrated in the first vessel. A main pump pulls cleaning liquid from the first pressure vessel and pumps it through a wash head to clean the tank.

A skimmer is used within the first pressure vessel for removing liquid contaminants and any floating solids from along the free surface. The floating liquid contaminants, commonly oils, are removed from the system.

A phase separator can be mounted beneath the suction inlets so that the cleaning liquid and dislodged contaminants from the dirty tank pass through the phase separator. The phase separator includes a number of vertically aligned, downwardly and inwardly tapered circumferential concentrators, typically having truncated conical shapes, open tops and open bottoms. The concentrators are mounted with the bottom of one concentrator generally horizontally aligned with the top of the underlying concentrator. The concentrators aid the phase separation of the contaminants, vapors, gases and the cleaning liquid. The uppermost concentrators are above the free surface so the cleaning liquid and contaminants impact against the inner surfaces of the uppermost concentrators; this tends to cause gases and vapors to be driven off before entering the cleaning liquid in the pressure vessel.

The concentrators cause the solids to settle on the bottom of the pressure vessel much more quickly than would otherwise occur. Heavy solids are directed to a single area below the phase separator. Many light solids, such as rags, become saturated with cleaning liquid within the phase separator and also sink to the bottom along with the heavy solids.

Liquid phase separation, typically between oily contaminants and water-based liquid cleaners, is also aided. Oily substances accumulate along the bottom edges of the concentrators, rise up to the upper edges of the concentrators and flow up along the connecting bars until they reach the free surface of the liquid. At that the time the oil phase spreads out over the free surface. When the oil phase is sufficiently thick, the skimmer can be used to draw it off.

Two factors therefore aid rapid phase separation. First, the use of the phase separators which act on the liquids, solids, vapors and gases coming from the dirty tanks. Second, when large amounts of solid materials are being removed, then the material can be directed to the second tank for the collection and concentration of the solids while the liquids, taken from the free surface of the liquid within the second pressure vessel, are allowed to flow into the first pressure vessel from which cleaning liquid is withdrawn from a lower region of the pressure vessel. Lighter liquid contaminants, which thus collect in the first pressure vessel, can be removed by the skimmer when sufficient quantities are collected.

With the present invention, cleaning liquid is recycled which eliminates the costly disposal problems associated with the single use of a cleaning liquid. This recycling is aided by the rapid phase separation of the vapors, gases, liquids and solids. Further provision for separating liquids with different densities, for example, oil and water, from one another is also provided for, such as through the use of a skimmer.

Another significant advantage of the present invention is its mobility. By mounting the apparatus to a trailer the cleaning system can be moved to the tanks to be cleaned. Railroad tank cars can be cleaned almost anywhere while tanks on ships can be cleaned while docked along a wharf or pier.

Other features and advantages of the present invention will be apparent from the following description in which the preferred embodiment is set forth in detail in conjunction with the accompanying drawing.

BRIEF DESCRIPTION OF THE DRAWING

The drawing FIGURE is a schematic representation of the vacuum loading cleaning system of the invention.

DETAILED DESCRIPTION OF THE PREFERRED EMBODIMENT

Turning now to the figure, the vacuum loading cleaning system 2 of the invention includes first and second pressure vessels 4, 5 each having a liquid outlet 8, 9 and containing a cleaning liquid 10 within the interior of the pressure vessels. Outlets 8, 9 fluidly connect to lower regions 12, 13 of vessels 4, 5 by standpipes 14, 15. A main pressure pump 16 has its inlet connected to liquid outlets 8, 9 through valves 18, 19 and its outlet connected to a heat exchanger 20 by a first line 22. Pressure gauges, identified in the figure by a "P" within a circle, are positioned along line 22 and elsewhere in system 2 for pressure monitoring. A strainer 24 removes solids from cleaning liquid 10 passing along first line 22. Cleaning liquid 10, after being heated in heat exchanger 20, passes through a line 26 to a pair of wash heads 28, 29. Wash heads 28, 29 are located within a dirty tank 30 and are used to spray cleaning liquid 10 within the dirty tank.

A vacuum pump 32 is used to produce a partial vacuum within upper regions 34, 35 of vessels 4, 5 through vacuum outlets 36, 37. Outlets 36, 37 are connected to an inlet 38 of pump 32 by a pair of lines 40, 41, which join at a junction 42 for passage through a common line 44 and a vacuum receiver 46 to pump 32. Receiver 46 is used to condense and collect liquid which may be drawn out through outlets 36, 37 so that the liquid does not enter pump 32. When receiver 46 becomes filled to the point that liquid is about to enter vacuum pump 32, it closes line 44 to prevent this from happening. A pair of valves 48, 49 are used along lines 40, 41 to control the drawing of a partial vacuum within regions 34, 35.

Cleaning liquid and dislodged contaminants, including solids such as dirt, rocks, rags and other debris, as well as liquids such as oil, are sucked out of dirty tank 30 through vacuum lines 50, 51. Lines 50, 51 are connected to pressure vessels 4, 5 at first suction inlets 52, 53 at their inner ends and to submersible booster pumps 54, 55 at their outer ends. Pumps 54, 55 are placed on the bottom of dirty tank 30 to suck up the cleaning liquid 10 and dislodge contaminants from dirty tank 30. Although in many applications booster pumps 54, 55 are not required, in some circumstances it is desired to augment the force of the partial vacuum provided by vacuum pump 32 within regions 34, 35 by the booster pumps. Although two booster pumps 54, 55 are shown in the preferred embodiment, a greater or lesser number can be used as well.

A set of valves 56 are placed along lines 50, 51 and on either side of a bridging line 58. Manipulation of valves 56 allows the user to control the flow of material through lines 50 and 51.

A phase separator 60, 61 is mounted within each of vessels 4, 5 directly beneath suction inlets 52, 53. Phase separators 60, 61 each include a number of truncated downwardly and inwardly tapering concentrators 62 connected to one another by a number of vertical connecting bars 64. Concentrators 62 have open tops 66 and open bottoms 68 to allow the material discharged through inlets 52, 53 to pass downwardly through concentrators 62. The amount of taper of concentrators 62 increases from the top concentrator 70 to the bottom concentrator 72. Concentrators 62 are positioned both above and below the free surfaces 74, 75 of cleaning liquid 10.

Material discharged into phase separators 60, 61 first impacts against the uppermost of concentrators 62 which direct the material downwardly and inwardly. This impact also helps to release gases and vapors directly into regions 34, 35 (rather than having gases be released in liquid 10 in regions 12, 13) thus aiding prompt phase separation. Solid material is concentrated towards the central axis of separators 60, 62 as it moves downwardly. Rocks and other heavy material fall freely through separators 60, 62 where they collect within lowered tapered portions 76, 77 of pressure vessels 4, 5. Some solid matter, such as rags, has a tendency to float. However, such material remains within concentrators 62, gets soaked and sinks to the bottom of pessure vessels 4, 5 much more quickly than would otherwise occur.

Assuming cleaning liquid 10 is a water based solvent, phase separation of oily residues from dirty tank 30 is aided by phase separators 60, 61 in the following manner. The oil collects on the surfaces of concentrators 62 and flows upwardly toward their tops 66. The oil then travels upwardly along connecting bars 64 until it reaches free surfaces 74, 75 at which time is spreads out over the free surfaces.

Solids are removed from pressure vessels 4, 5 by conventional solids remover pumps 80, 81. Pumps 80, 81 are connected to tank outlets 82, 83 at the bottoms of tapered portions 76, 77 through valves 86, 87. The mixture of solids and liquids is pumped through lines 88, 89 and into a solids separator 90. Solids separator 90, which is conventional, discharges solids 92 for disposal. Liquid from separator 90 passes through a liquid outlet 94 into a liquid receiver 96. Liquid receiver 96 is fluidly coupled to second suction inlets 98, 99 of first and second pressure vessels 4, 5 through lines 100, 101. Valves 102, 103 are placed along lines 100, 101 to control passage of liquid from receiver 96 back into pressure vessels 4, 5.

Vacuum pump 32 includes an exhaust port 104 fluidly connected to atmosphere or dirty tank 30 or solid separator 90 along lines 106 or 108 or 110 respectively. Valves 112, 114 and 116 are used to control which of lines 106, 108 or 110 are open. If dirty tank 30 contains noxious or poisonous vapors or gases, it is usually desired that the system be a closed loop, in which case the exhaust from vacuum pump 32 would be pumped back into tank 30 to achieve a closed system. Since the temperature of the gas leaving exhaust port 104 is about 300° F., it has been found useful to inject this hot air into solids separator 90 for better operation when closed loop operation is not required. Solids from strainer 24 can be introduced into solids separator 90 as indicated by line 117.

A skimmer 118 is mounted within first pressure vessel 4 at free surface 74. Skimmer 118 is connected to a skimmer outlet 120 by a pipe 122. Outlet 120 is connected to the inlet of pump 80 by a line 124. A valve 126 is positioned along line 124 and is opened when it is desired to skim liquid at free surface 74 from within pressure vessel 4. This is usually done when sufficient oil has collected along free surface 74 and it is desired to remove that oil. Thus, when operating skimmer 118, a valve 128 along a side line 130, connected to line 88, is opened to allow the oil at free surface 74 to be removed from the system. Skimmer 118 can also be used for removing floating solid material from pressure vessel 4 as well.

First and second pressure vessels 4, 5 are fluidly connected by a passageway 132 which connects their interiors at the regions adjacent free surfaces 74 and 75. This way liquid from second pressure vessel 5 adjacent its free surface 75 can flow from pressure vessel 5, through passageway 132, through a control valve 134 and into pressure vessel 4.

In use, booster pumps 54, 55 are placed on the bottom of dirty tank 30 at appropriate low points. Wash heads 28, 29 are positioned within dirty tank 30 as well. Assuming dirty tank 30 contains poisonous or noxious gases or vapors, line 108 is connected to tank 30, valves 112 and 116 are closed and valve 114 is opened to achieve a closed system. Of course dirty tank 30 is also sealed to the atmosphere. Assuming that dirty tank 30 includes relatively large debris, valves 56 are operated so everything is directed through first suction inlet 53 in second vessel 5. That is, valve 136 is closed while the other valves 56 are opened. Valves 48, 49, 18, 134, 103 and 87 are opened while valves 126, 86, 19, 128 and 102 are closed. Vacuum pump 32, main pump 16, solids remover pump 81 and booster pumps 54, 55 are then actuated. Heat exchanger 20 is fired up to heat cleaning liquid 10 prior to being ejected through wash heads 28, 29. The cleaning liquid and dislodged contaminants are sucked into vessel 5 through booster pumps 54, 55, line 51, through first suction inlet 53 and into phase separator 61. The material entering phase separator 61 first contacts the uppermost of concentrators 62 where gases and vapors are released into region 35. Liquid at free surface 75, often a mixture of oil and a water-based cleaning liquid, flows from second pressure vessel 5 to first pressure vessel 4 through passageway 132 and open valve 134 so that oily residue collects and concentrates at free surface 74 within first pressure vessel 4. Solids collect in tapered portion 77 and are pumped into separator 90 by pump 81 as necessary. Solids 92 are disposed of while liquid from separator 90 passes through outlet 94 and into receiver 96 where it is sucked back into second pressure vessel 5. Vacuum pump 32 draws a partial vacuum within regions 34, 35 and exhausts gas through valve 114 and line 108 and into dirty tank 30. When sufficient oil has been collected along surface 74, valves 126 and 128 are opened and pump 80 is actuated to remove the oil at free surface 74 from the system through line 130.

Modification and variation can be made to this embodiment without departing from the subject of the invention as defined in the following claims. For example, heated liquid 10 can be tapped off of line 26 for introduction into solid separator 90. This may be useful when system 2 is operating in a closed loop so that the exhaust from pump 32 is not available for heating separator 90. Also, if the liquid contaminant is heavier than liquid cleaner 10, it would have a tendency to settle within tapered portion 77. By first introducing all of the liquids, solids, gases and vapors from dirty tank 30 into second pressure vessel 5, these heavier liquid contaminants can be removed, along with solids, from the system through tapered portion 77, valve 87, pump 81, line 81 and into separator 90. By closing valve 103 and opening valve 102, the liquid from receiver 96 would be sucked into vessel 4 where it would collect in tapered portion 76. The heavy liquid contaminants would be removed from system 2 through valve 86, pump 80, line 130 and valve 128. If desired phase separator 60 may be eliminated from vessel 4. Also, second pressure vessel 5 may be eliminated.

I claim:

1. A surface cleaning system for use with a cleaning liquid comprising:

a substantially sealed pressure vessel having a liquid outlet, a vacuum outlet and a suction inlet in fluid communication with the interior of said vessel, said vacuum outlet and said suction inlet communicating with an upper region of said vessel and said liquid outlet communicating with a lower region of said vessel;

first pump means, fluidly connected to said liquid outlet, for pumping the cleaning liquid from said vessel through a first line, said liquid partially filling said pressure vessel so that said vacuum outlet is above the free surface of said cleaning liquid;

means, fluidly connected to said vacuum outlet, for drawing a partial vacuum within said upper region of said pressure vessel;

means fluidly connected to said first line for directing said cleaning liquid at a surface to be cleaned to dislodge contaminants from said surface;

a second line fluidly connected to said suction inlet at one end to provide a source of suction at the other end of said second line, said other end positioned at the surface to be cleaned so to suck cleaning liquid and dislodged contaminants from the surface and back to said vessel;

a booster pump mounted along said second line to aid movement of said cleaning liquid and dislodged contaminants along said second line;

solids separator means, including a solids separator inlet, for removing solids from a mixture of solids and liquids;

pipe means for fluidly connecting said solids separator inlet to said vessel, said pipe means adapted to pass a mixture of solids and said cleaning liquid from said vessel to said solids separator means; and said solids separator means including a liquid outlet, fluidly coupled to the interior of said vessel, for drawing liquid from said solids separator means into said vessel.

2. The cleaning system of claim 1 further comprising: a phase separator comprising a plurality of inwardly and downwardly tapering circumferential concentrators, said concentrators having open tops and open bottoms to permit solids to pass therethrough, and means for mounting said concentrators within the vessel above and below the free surface in a vertically aligned, spaced apart relationship underlying the suction inlet.

3. The cleaning system of claim 1 further comprising a third line fluidly connected to said suction inlet at one end to provide a source of suction at the other end of said third line, said third line other end fluidly connected to the solids separator means liquid outlet.

4. The cleaning system of claim 1 wherein the pressure vessel includes first and second pressure vessels fluidly connected in parallel.

5. The cleaning system of claim 1 further comprising a liquid heater positioned along said first line to heat said cleaning liquid passing through said first line.

6. The cleaning system of claim 1 further comprising a solids strainer along said first line for removing solids from said cleaning liquid passing through said first line.

7. A tank cleaning system for use with a cleaning liquid comprising:
a tank to be cleaned;
a substantially sealed pressure vessel containing a cleaning liquid and having a liquid outlet, a vacuum outlet and first and second suction inlets in fluid communication with the interior of said vessel, said vacuum outlet and said first and second suction inlets communicating with an upper region of said vessel and said liquid outlet communicating with a lower region of said vessel;
first pump means, fluidly connected to said liquid outlet, for pumping the cleaning liquid from said vessel through a first line, said liquid partially filling said pressure vessel so that said vacuum outlet is above the free surface of said cleaning liquid;
means, fluidly connected to said vacuum outlet, for drawing a partial vacuum within said upper region of pressure vessel;
means for heating the cleaning liquid passing through said first line;
means, fluidly connected to said first line, for directing said cleaning liquid at the inerior of the tank to be cleaned thereby dislodging contaminants therefrom;
a second line fluidly connected to said first suction inlet at one end and to the interior of the tank at its other end whereby the partial vacuum within said vessel produces suction at said other end to suck said liquid cleaner and dislodged contaminants from the tank into said vessel;
a submersible booster pump at said other end of said second line to aid movement of the liquid cleaner and dislodged contaminants along said second line;
solids separator means for removing solids from a mixture of solids and liquids;
pipe means for fluidly connecting an inlet of said solids separator means to said lower region of said vessel, said pipe means adapted to pass a mixture of solids and said cleaning liquid from said vessel to said solids separator means; and
said solids separator means including a liquid outlet fluidly coupled to said second suction inlet for drawing liquid from said solids separator means into said vessel.

8. The cleaning system of claim 7 wherein said partial vacuum drawing means includes a vacuum pump having an inlet coupled to said vacuum outlet of said vessel and an outlet coupled to the tank so that said cleaning system is a substantially closed system.

9. The cleaning system of claim 7 further comprising:
a phase separator comprising a plurality of inwardly and downardly tapering circumferential concentrators, said concentrators having open tops and open bottoms to permit solids to pass therethrough, and means for mounting said concentrators within the vessel above and below the free surface in a vertically aligned, spaced apart relationship underlying the first suction inlet.

10. A surface cleaning system, for use with a cleaning liquid, comprising:
first and second substantially sealed pressure vessels each having a liquid outlet, a vacuum outlet and a suction inlet in fluid communication with the interiors of said first and second vessels, said vacuum outlets and said suction inlets communicating with respective upper regions of said vessels and said liquid outlets communicating with respective lower regions of said vessels;
first pump means, fluidly connected to said liquid outlets, for pumping the cleaning liquid from at least one of said vessels through a first line, said cleaning liquid partially filling said pressure vessels so that said vacuum outlets are above the free surfaces of said cleaning liquid;
means for fluidly connecting said first and second vessels at said free surfaces so to permit the top layer of said liquid to flow between said first and second vessels;
a skimmer in said first vessel for removing liquid at said free surface;
means, fluidly connected to said vacuum outlets, for selectively drawing a partial vacuum within said upper region of said pressure vessels;
solids contained within at least the second vessel so to create a mixture of solids and the cleaning liquid;
solids separator means for removing the solids from the mixture of solids and cleaning liquid;
pipe means for fluidly connecting an inlet of said solids separator means to at least said second vessel, said pipe means adapted to pass the mixture of solids and cleaning liquid from at least said second vessel to said solids separator means; and
said solids separator means including a liquid outlet fluidly coupled to the interior of at least one of said vessels for drawing liquid from said solids separator means into said leaast one vessel.

11. The system of claim 10 further comprising:
a second line fluidly connected to at least one of said suction inlets of at least one of said pressure vessels at one end and to the surface to be cleaned at its other end whereby the partial vacuum within said at least one pressure vessel produces suction at said other end to suck said cleaning liquid and any dislodged contaminants from the surface to be cleaned into said at least one pressure vessel; and
a submersible booster pump at said other end of said second line to aid movement of the cleaning liquid and dislodged contaminants along said second line.

* * * * *